Jan. 21, 1964  A. M. SOUTHWORTH ETAL  3,118,834
SEWAGE TREATMENT APPARATUS
Filed Oct. 3, 1960  3 Sheets-Sheet 2

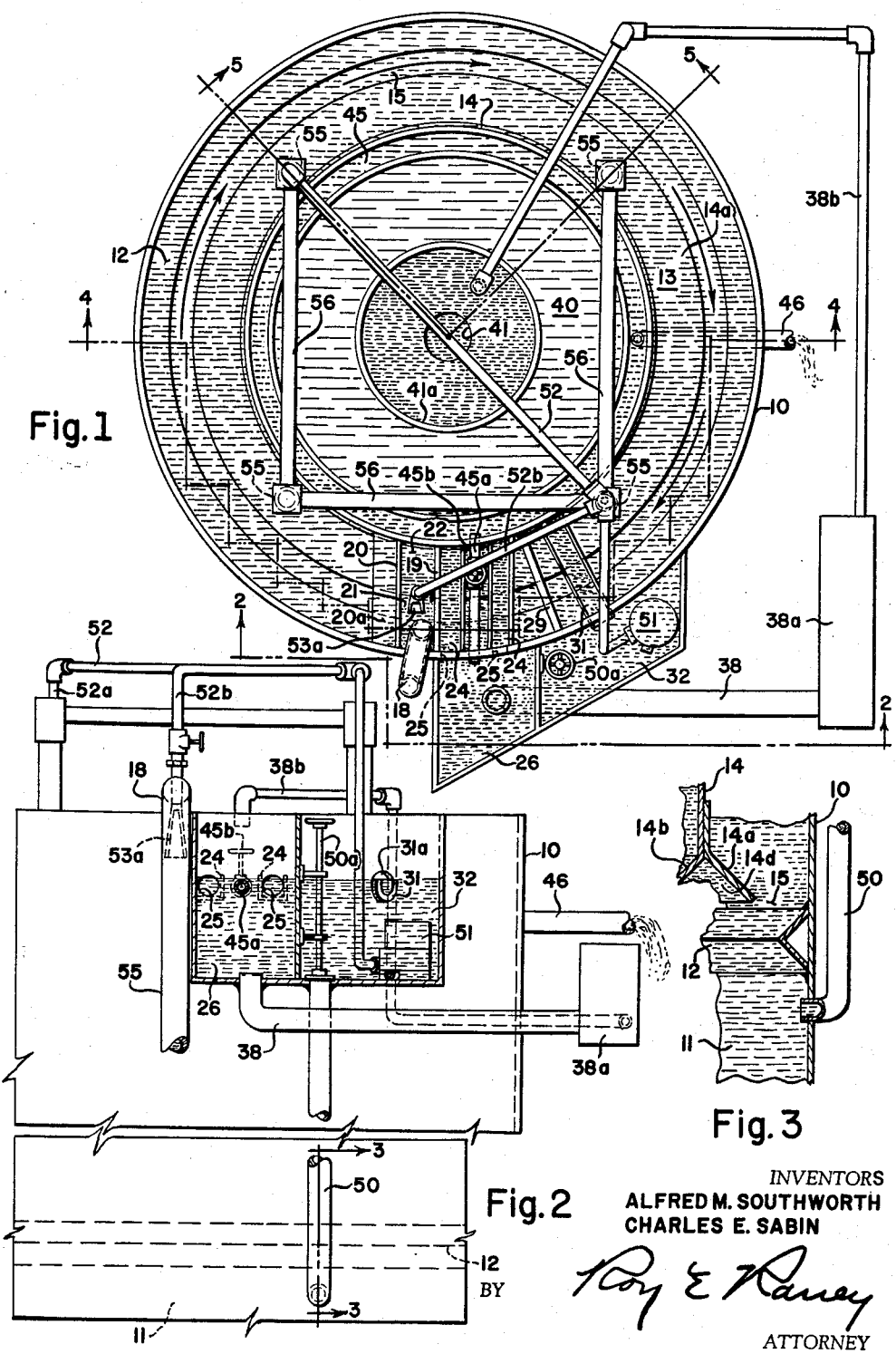

INVENTORS
ALFRED M. SOUTHWORTH
CHARLES E. SABIN
BY Roy E. Raney
ATTORNEY

United States Patent Office 3,118,834
Patented Jan. 21, 1964

3,118,834
SEWAGE TREATMENT APPARATUS
Alfred M. Southworth, 201 S. Dale Mabry Blvd., Tampa, Fla., and Charles E. Sabin, Tampa, Fla.; said Sabin assignor to said Southworth
Filed Oct. 3, 1960, Ser. No. 60,102
2 Claims. (Cl. 210—195)

The present invention relates to improved apparatus for treating sewage by clarification, sedimentation and anerobic digestion of the solids removed from the sewage.

One object of the present invention is the provision of a sedimentation chamber for a sewage treating apparatus comprising an elongated chamber having means to establish a liquid level therein, the sewage being introduced into the chamber through a passageway which opens into the chamber well below the liquid surface and which directs the liquids in a downward direction whereby the settling of the heavier solids is promoted while the lighter materials must travel upwardly through the body of liquid. The passage of liquids into the chamber is governed by the difference in head between the liquid in the passageway and the liquid in the chamber, and knowing the maximum flow rate into the inlet passageway, the cross sectional area of the inlet opening can be determined to maintain the velocity of flow of sewage into the chamber at a relatively low rate best suited for the sedimentation process.

A further object of the invention is the provision of an annular shape sedimentation chamber having an annular opening at the bottom leading into a digestion chamber. Preferably, a partition intermediate the side walls forms the end walls of the chamber.

Another object of the present invention is the provision of an improved apparatus for the treatment of sewage comprising a unitary structure having an annular primary sewage clarification chamber providing an elongated path of travel for the liquids of the sewage whereby the heavier solids settle into a subadjacent digestion chamber while buoyant materials are removed by suitable means such as a skimmer. The balance of the liquid passes to a filter and is subsequently directed into a secondary clarification chamber disposed concentric with the primary clarification chamber and above the digestion chamber and arranged to effect a flow of the liquid downwardly to cause the heavier flocculent material to settle into the digestion chamber and the lighter flocculent matter to be carried radially, outwardly and upwardly where it coagulates and sinks into the digestion chamber. By our invention, the complete clarification of sewage liquid and the digestion of sewage liquids or sludge is effected in a structure comprising an upright cylindrical tank having the digestive chamber in the lower portion and the primary and secondary clarification chambers concentrically arranged in the upper portion thereof, thereby providing economy in the construction and maintenance, as well as minimizing space requirements.

A still further object of the invention is the provision of an improved sewage treating apparatus of the character mentioned in which the bottom walls of the primary and secondary clarifier chambers form a gas and scum receiving hood above the digester chamber, the hood having gas outlets, connected by conduits to atmosphere or to a suitable gas disposal unit, such as burners, and supernatent liquor is withdrawn from the digestion chamber and discharged under pressure through a nozzle under the hood to continually break up and disperse scum tending to form at the top of the digester. Preferably, the scum and other materials skimmed from the liquid in the primary chamber are mixed with this supernatent liquor and carried thereby into the digestion chamber. This arrangement prevents ingress of air into the digestion chamber, which would otherwise be detrimental to the bacterial action, and at the same time the scum is effectively broken and dispersed to promote effective digestive action thereon merely by operation of a pump discharging into the tank. The discharge of the liquids beneath the hood obviates the need for mechanical scrapers and the like, and the operation costs and maintenance of the apparatus is thereby minimal.

A still further object of the invention is the provision of a sewage treatment apparatus of the character mentioned in which the secondary clarification chamber comprises an upright cylindrical chamber having a funnel-shape bottom wall opening into the top of the digestion chamber, and an axially disposed tubular liquid inlet flared at the bottom and spaced from and aligned with the opening into the digestion chamber, the flared end serving to entrap any gases rising through the opening from the digestion chamber and discharge them to atmosphere and also causing liquid entering the secondary chamber to spread radially and to move upwardly to a discharge at the top portion of the chamber, the speed of the liquid being regulated by the discharge rate into the inlet tube according to the diameter of the tube, so that flocculent material is suspended to collect upwardly moving similar material which coagulates into a mass and sinks into the digestion chamber below. Thus, the form of the clarification chamber and its location relative to the digestion chamber provides exceedingly efficient clarification of the liquids treated.

Other objects of the invention will be apparent from the following description of a preferred form of the invention, reference being made to the accompanying drawings wherein FIG. 1 is a plan view of a sewage treating apparatus embodying the invention;

FIG. 2 is a fragmentary view of the apparatus shown in FIG. 1, taken along line 2—2 of FIG. 1;

FIG. 3 is a fragmentary section taken along line 3—3 of FIG. 2;

Figure 4:
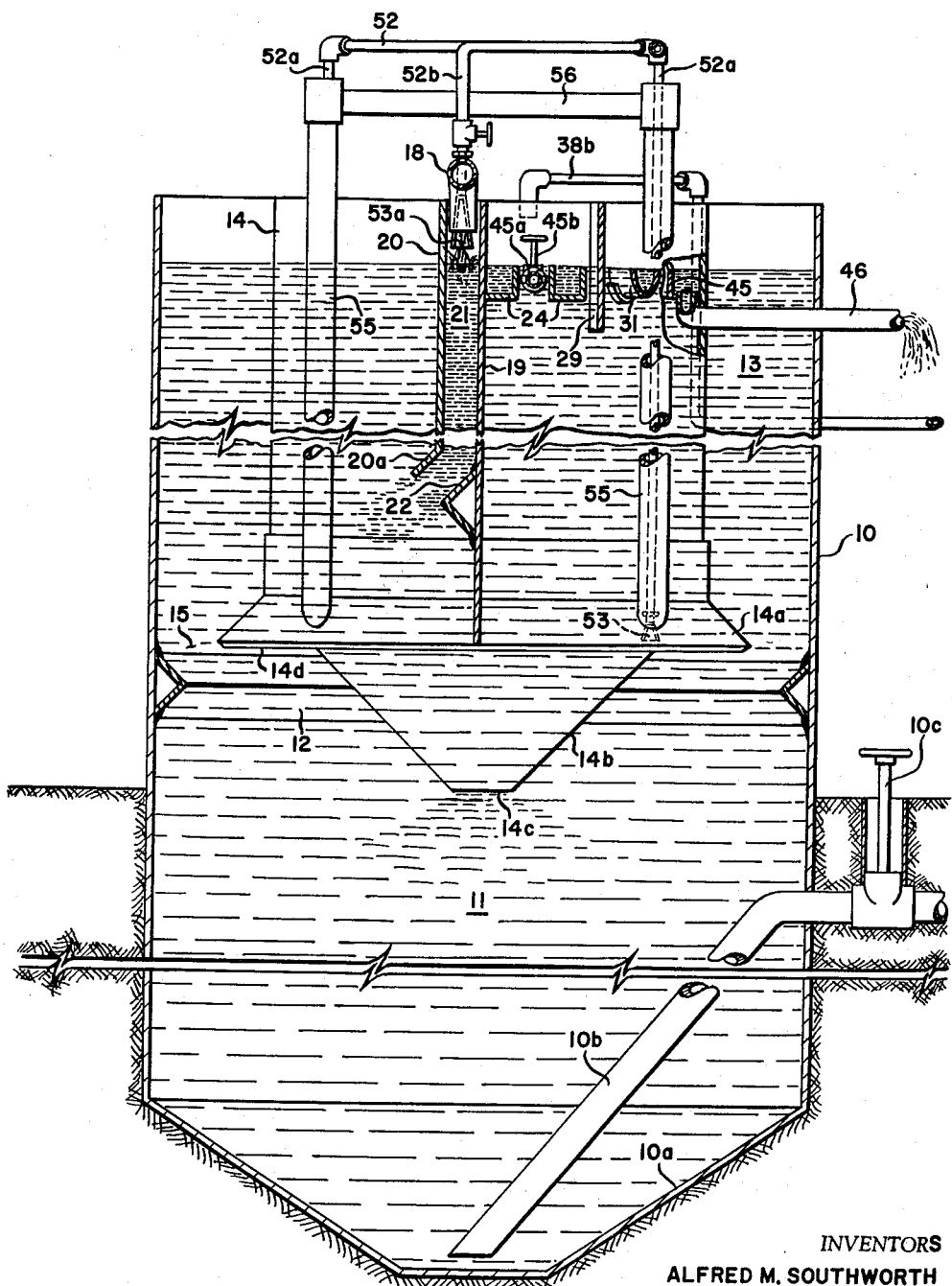
FIG. 4 is a sectional view taken along line 4—4 of FIG. 1.
Figure 5:
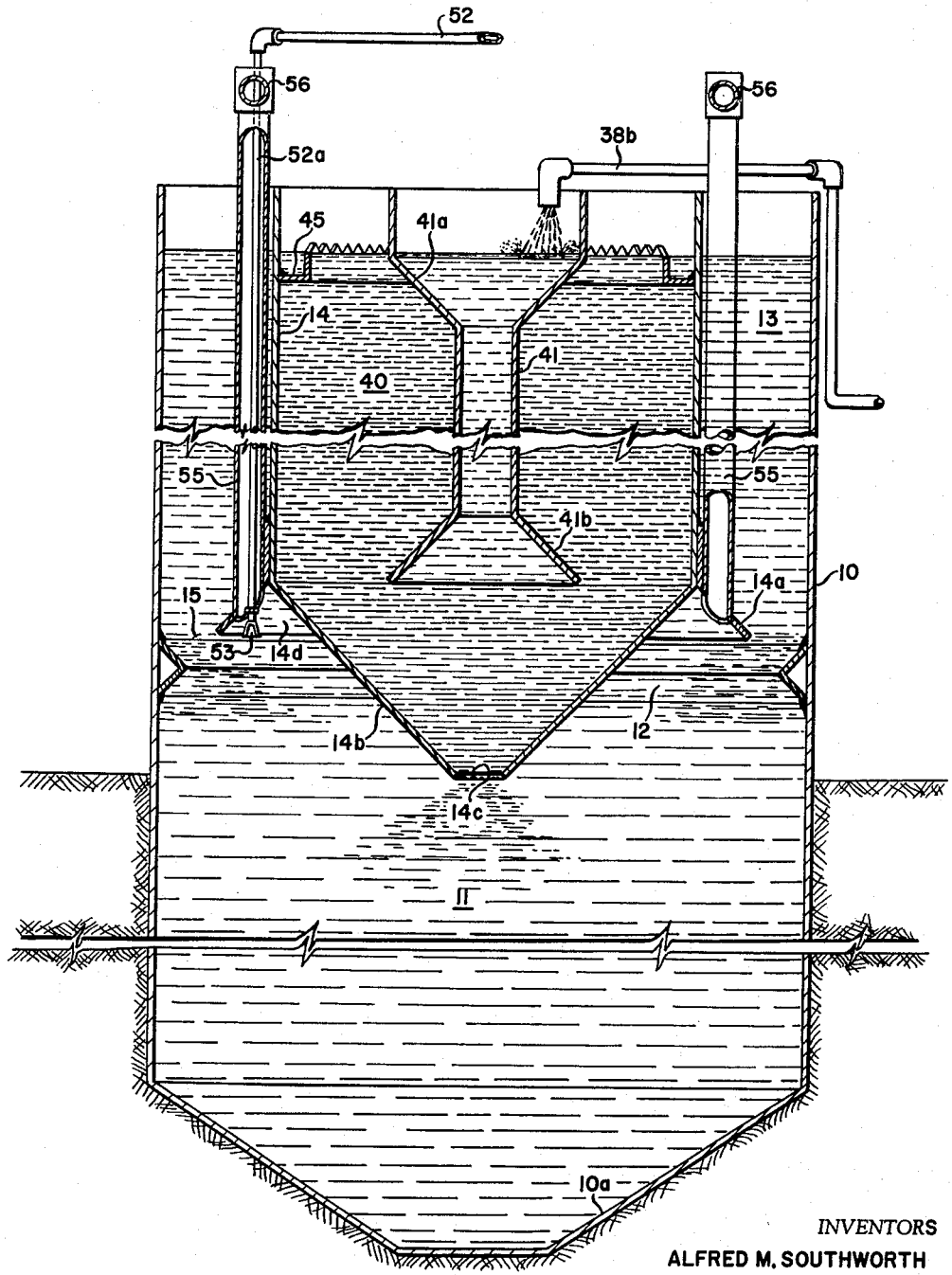
FIG. 5 is a sectional view taken along line 5—5 of FIG. 1.

In the preferred form of the invention the apparatus comprises an upright cylindrical, open-topped tank 10, which may be formed of any suitable material such as metal plate, the bottom of which tank is in the form of a sump forming wall 10a, which collects ingested sludge which may be drawn off from time to time through a pipe 10b having a control valve 10c therein. The tank may be supported by any suitable means, such as being partially buried in the earth, as is illustrated in the drawings, or it may be supported in its vertical position by a suitable superstructure. The tank may be of any desirable size, and as a typical illustration may be twenty feet in length and eight feet in diameter.

Approximately the lower half of the tank comprises a digestion chamber 11, the top of which is partially defined by an annular corbel 12 formed thereabout, which corbel comprises a portion of the bottom wall of an annular primary clarification chamber 13. The outer wall of chamber 13 is comprised of the upper portion of tank 10, and the inner wall is formed by an open top cylinder 14 concentric with tank 10, the lower end portion of which has an outwardly flaring frusto-conical baffle 14a, the outer edge of which is spaced slightly from corbel 12 to provide a narrow passage 15 leading from the bottom of chamber 13 into digestion chamber 11, so that an annular hopper is formed by the corbel and flange for collecting and directing solids from the primary clarification chamber into the digestion chamber. The lower end of cylinder 14 has an inverted frusto-conical bottom wall 14b having an opening 14c therein, preferably below the plane of corbel 12, and flanges 14a and 14b form an annular inverted trough shape hood at the top of digestion chamber 11.

Raw sewage may be discharged into primary clarification chamber 13 through a sewage discharge pipe 18 which empties into the top of tank 10 and discharges the sewage between two vertical partitions 19 and 20 which interconnect the interior wall of tank 10 and cylinder 14. The walls of tank 10, cylinder 14, and partitions 19 and 20 form a downwardly projecting inlet passageway or chute 21 which terminates short of corbel 12 and which is provided with an inclined deflector member 22 attached to partition 19 for discharging the sewage laterally and downwardly so as to evenly disperse the solids in the sewage as it enters primary clarification chamber 13, as seen in FIG. 4. Preferably, the lower end of wall 20 is turned at 20a in parallel relationship to deflector 22. The inlet chute arrangement permits control of the head of the sewage therein relative to the liquid level in chamber 13 by predetermining its cross-sectional area according to the expected quantity of sewage to be treated so as to produce optimum settling velocity of the sewage as it travels toward the discharge or outlet of the chamber described more fully hereinafter.

The discharge or outlet end of the primary clarification chamber 13 is formed by partition 19 and liquid is discharged from the chamber near the right side of the partition, as seen in FIGS. 1 and 4, through weir boxes 24, which extend between the walls of tank 10 and cylinder 14, and the outer ends of which empty through openings 25 into an effluent box 26 on the exterior of tank 10. This arrangement causes the sewage to work around chamber 13 clockwise as indicated by the arrows in FIG. 1, during which time the solids settle down into chamber 11 and the buoyant material rises to the surface. Prior to the discharge of liquid from chamber 13 into box 26, floating matter is skimmed therefrom by causing the liquid to pass under a baffle 29 interconnecting tank wall 10 and cylinder 14. The floating matter accumulates adjacent to baffle 29 and is periodically skimmed off by a semi-cylindrical skimming through 31 which extends through an opening 31a in tank 10 and transversely of chamber 13 and which may be tilted periodically about its axis to lower one edge beneath the liquid surface to skim the surface of the liquid and flow the greases, scum and other buoyant matter outwardly into a recirculation box 32 on the exterior of tank 10. Skimming troughs of the kind shown are well known in the art and no further description thereof is necessary except to say that they may be manually operated by an operator observing the operation from the open top of the tank.

The liquid which enters effluent box 26 is carried off by way of pipe 38, opening through the bottom of the box, to a suitable purifying apparatus 38a, such as a trickling filter or an aeration unit and returned through a pipe 38b by a suitable pump, such as an air lift type, not shown, to a secondary clarification chamber 40 concentric with primary chamber 13.

Chamber 40 is defined by the interior of cylinder 14, and its inlet comprises a vertically extending tube 41 concentric with cylinder 14 and having a funnel shaped opening 41a at the top end and a frusto-conical flaring baffle 41b at the lower end thereof. The lower edge of baffle 41b terminates approximately in the same plane as the lower end of cylinder 14 and spreads radially appreciably beyond the axial projections of the edges of opening 14c so as to entrap any gases which may rise through the opening. Cylinder 14 and tube 41 are positioned in tank 10 by suitable brace structure which is not shown as the details of such structure need not involve invention and to show the same would tend to confuse the disclosure. The outlet of chamber 40 comprises an annular weir box 45 which is attached to the upper inner wall of cylinder 14 and has a drain pipe 46 connected therewith which leads to an ultimate drain off, outside the apparatus.

By the arrangement shown, primary effluent from box 26 is treated through the trickling filter 38a and returned to the final or secondary clarification chamber 40 via pipe 38b and discharged downwardly thereby into tube 41, which is restricted so as to increase the velocity of the liquid and thereby cause the larger particles therein to be carried by their momentum downwardly and finally settle through opening 14c into digestion chamber 11 while the velocity of the liquid entering the area defined by flange 41b is reduced. The liquid discharging through the lower end of tube 41, losing its velocity, spreads radially from flange 41b and moves upwardly to overflow weir box 45. This upward movement causes the flocculent particles therein to become substantially stationary at approximately the mid-height of chamber 40, due to gravitational pull, and form a filter body which builds into such mass that it settles downwardly onto flange 41b and is thereby directed through opening 14c into the digestion chamber below.

Preferably, a portion of the clarified secondary fluid may be diverted from weir box Preferably, a portion of the clarified secondary fluid may be diverted from weir box 45 through a pipe 45a leading from the weir box into box 26, the flow through this pipe being controlled by valve 45b so that an optimum volume of recirculation fluid is provided through the treating apparatus 38a, etc.

In order to dispose of the strong supernantent fluid which collects in chamber 11, provision is made to recirculate such fluid into the primary clarification chamber so that it is diluted by the raw sewage and passes to purifier 38a from the primary chamber in a form readily handled by the purifier.

This recirculation of the supernatent liquid is accomplished by its introduction into recirculation box 32 through a pipe 50 which connects with the interior of tank 10 slightly below the upper portion of chamber 11 with the bottom of box 32, the flow being controlled by a valve 50a. This supernatent liquid, together with skimmed material in box 32 is passed through a suitable pump 51 and discharged under pressure beneath hood 14d and also into primary clarification chamber 13. For this purpose the discharge of pump 51 is connected to a pipe 52 which carries the liquid across the top of chamber 40 to a vertical pipe 52a which extends downwardly through flange 14a into hood 14d and which has a nozzle or spray head 53 at the lower end arranged to direct the liquid at high velocity tangentially of the hood so as to create turbulence throughout the hooded area, thereby breaking up and dispersing scum and the like. Preferably, a second nozzle is similarly connected with pipe 52 and disposed beneath hood 14d at 180° to nozzle 53 to assist in the dispersal action described. A nozzle 53a is connected to pipe 52 through a pipe 52b and is arranged to discharge the recirculated supernatent liquid at high velocity onto the surface of the raw sewage in chute 21, thereby breaking up scum and dispersing foam, which is likely to form from the presence of detergents in the sewage.

Gas emanating from the digestion of the sludge in chamber 11 accumulates beneath hood 14d and is carried away, principally, through four conduits 55 extending vertically from openings formed through flange 14a, and these conduits are connected with a manifold 56 which leads to atmosphere or to any other disposal means, such as a gas burner which is not shown. A slight amount of gas may escape upwardly through opening 14d, but due to the spread of flange 41b this gas will be confined to bubble upwardly through tube 41 to atmosphere. It will be seen that gas arising in digester chamber 11 is prevented from entering the secondary clarification chamber.

In the form of the invention shown, pipe 52a is extended within one of the conduits 55 as is the pipe for the second nozzle disposed in hood 14d.

In the operation of the apparatus, raw sewage is deposited into primary clarification chamber 13 and moves throughout the relatively lengthy extent thereof to enable the heavier solids to descend into chamber 11 where the solids are subject to anerobic digestion. Scum and other floating matter is removed from the liquid through scum troughs 31, and the balance of this partially clarified liquid containing matter that is held in suspension in the colloidal state, or in solution, then flows from weir boxes 24 into effluent box 26 for further treatment in purifier 38a, after which it is returned to secondary chamber 40 wherein the flocculent material is removed in the manner described hereinbefore. This clarified liquid is then discharged from annular weir box 45 through pipe 46 to the ultimate drain off. At the same time, supernatent fluid is taken from chamber 11 through pipe 50 and returned to the primary clarification chamber by way of spray heads 53 and 53a, as described, which action disperses the supernatent fluid in the chamber and tends to break up any scum formations which would otherwise resist anerobic digestion process.

It will be seen that by our apparatus a highly efficient sedimentation and digestive sewage disposal apparatus is provided which is compact and which, by controlling the flow of material and the disposition of the clarification chambers, produces complete and trouble-free treatment of sewage. The only moving parts are two pumps, which are relatively inexpensive to operate and maintain. Furthermore, the nature of the apparatus permits it to be easily relocated, should its use become unnecessary in one location.

While we have described but one form of the invention, it is to be understood that other forms, modifications and adaptations can be made all falling within the scope of the claims which follow.

We claim:
1. A sewage treating apparatus comprising:
    (a) a tank having a cylindrical side wall and a sloping bottom wall forming a sump,
    (b) an annular corbel extending inwardly from the medial portion of said cylindrical side wall and dividing said tank into an upper clarifier portion and a lower digester portion, said corbel having an inwardly and downwardly sloping upper surface and having an inwardly and upwardly sloping lower surface,
    (c) a second cylindrical wall disposed in said upper portion of said tank in spaced concentric relation to said first cylindrical wall so as to define therebetween an annular first clarifier chamber, the lower portion of said second cylindrical wall terminating above said corbel,
    (d) a funnel shaped wall extending inwardly and downwardly from said lower portion of said second cylindrical wall into the digester portion of said tank, said second cylindrical wall and said funnel shaped wall defining a second clarifier chamber, said funnel shaped wall having a central opening communicating between said second clarifier chamber and said digester portion,
    (e) a flange extending downwardly and outwardly from said lower portion of said second cylindrical wall toward said corbel but terminating short thereof, said upper surface of said corbel cooperating with said flange to define an annular and open bottomed trough between said first clarifier chamber and said digester portion of said tank, and the lower surface of said corbel cooperating with said funnel shaped wall to define an annular inverted trough shaped hood between said digester portion and both of said first and second clarifier chambers,
    (f) input passageway means for introducing sewage at one point into said first clarifier chamber for circular travel therein about said second cylindrical wall whereby falling solids are guided by said corbel and flange into said digester portion, said passageway means including a pair of spaced walls extending transversely of said concentric cylindrical walls and one of which extends upwardly from the vicinity of said corbel and an input discharge conduit discharging into the top of said input passageway, said one wall forming one end of said clarifier chamber,
    (g) weir means disposed adjacent said one wall of said input means for removing liquid from said first clarifier chamber after circular travel therethrough,
    (h) a trickling filter externally of said cylindrical tank,
    (i) vertical conduit means disposed centrally in said second clarifier chamber and terminating above said opening in said funnel shaped wall, said conduit means comprising an outwardly flared lower end whereby floc entraining liquid flowing downwardly in said conduit means will be radially dispelled into said second clarifier with an accompanying reduction in velocity and without disturbing settling of floc from said second clarifier chamber through said opening into said digester portion of said tank,
    (j) conduit means for conducting liquid from said weir means through said trickling filter and returning liquid from said filter to discharge into the top of said vertical conduit means, and
    (k) an annular weir disposed at the periphery of said second clarifier chamber for carrying off liquid therefrom as an effluent.

2. Sewage treating apparatus as defined in claim 1 and comprising gas vent means communicating with the apex of said annular inverted trough-shaped hood.

References Cited in the file of this patent

UNITED STATES PATENTS

| | | |
|---|---|---|
| 924,664 | Imhoff | June 15, 1909 |
| 2,553,228 | Yonner | May 15, 1951 |
| 2,717,873 | Montgomery et al. | Sept. 13, 1955 |
| 2,801,007 | Thompson | July 20, 1957 |
| 2,901,114 | Smith et al. | Aug. 25, 1959 |
| 2,907,712 | Eidsness et al. | Oct. 6, 1959 |
| 3,010,581 | Knapp et al. | Nov. 28, 1961 |

FOREIGN PATENTS

| | | |
|---|---|---|
| 319,365 | Germany | Mar. 2, 1920 |